United States Patent
Sloge et al.

(10) Patent No.: US 7,881,517 B2
(45) Date of Patent: *Feb. 1, 2011

(54) METHOD OF ANALYSING CELL SAMPLES, BY CREATING AND ANALYSING A RESULTANT IMAGE

(75) Inventors: Erik Sloge, Uppsala (SE); Tobias Soderman, Uppsala (SE); Lennart Bjorkesten, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 990 days.

This patent is subject to a terminal disclaimer.

(21) Appl. No.: 11/611,934

(22) Filed: Dec. 18, 2006

(65) Prior Publication Data

US 2007/0292044 A1 Dec. 20, 2007

Related U.S. Application Data

(63) Continuation of application No. 10/129,448, filed as application No. PCT/SE00/02124 on Oct. 31, 2000, now Pat. No. 7,155,050.

(30) Foreign Application Priority Data

Nov. 3, 1999 (SE) .................................. 9903988

(51) Int. Cl.
*G06K 9/00* (2006.01)
(52) U.S. Cl. ............................. 382/133; 382/134; 435/4
(58) Field of Classification Search ................. 382/133, 382/134; 435/4
See application file for complete search history.

(56) References Cited

U.S. PATENT DOCUMENTS 5,235,522 A 8/1993 Bacus
5,694,478 A 12/1997 Braier et al.
6,043,025 A * 3/2000 Minden et al. ................. 435/4

(Continued)

FOREIGN PATENT DOCUMENTS

WO    WO96/33406    10/1996

OTHER PUBLICATIONS

Bettens, E., et al., "Computer Analysis of Two-Dimensional Electrophoresis Gels: A New Segmentation and Modeling Algorithm", Electrophoresis, 1997, vol. 18, p. 792-798.

(Continued)

*Primary Examiner*—Wesley Tucker
(74) *Attorney, Agent, or Firm*—Yonggang Ji

(57) ABSTRACT

A method is provided for comparing multiple samples of cell extract containing a plurality of components. The method comprises the steps of preparing at least two samples of cell extract from at least two groups of cells and of exposing each of said sample of said cell extract to a different one of a set of matched markers, e.g. luminescent markers, to bind the marker to the cell extract to label the cell extract, each marker within said set of markers being capable of binding to the cell extract and can be individually detected from all other markers within said set. The samples are then mixed to form a mixture and said mixture is electrophoresed to separate the components within the cell extract. At least two electronic images of the electrophoresed mixture are obtained (I) by detection of the individual markers, each image being represented by detection of a marker different from the others. One resultant electronic image ($I_{res}$) of the obtained at least two electronic images is created (II) and analyzed in order to identify spot analysis areas (III). The identified spot analysis areas are applied on the respective at least two electronic images for evaluating said areas in order to detect spots representing components of said cell extracts (IV).

19 Claims, 5 Drawing Sheets

U.S. PATENT DOCUMENTS 6,535,624 B1     3/2003    Taylor, Jr.
6,611,766 B1     8/2003    Larsen et al.
7,155,050 B1*    12/2006   Sloge et al. ................ 382/133

OTHER PUBLICATIONS

Thompson, A., et al., "Information Extraction from 2D Electrophoresis Images", Proceedings of the 20th Annual International Conference of the IEEE Engineering in Medicine and Biology Society, vol. 20, No. 2, 1998, p. 1060-1063.

Watanabe, K., et al., "Automated Detection and Matching of Spots in Autoradiogram Images of Two-Dimensional Electrophoresis for High-Speed Genome Sequencing", Kanazawa Institute of Technology, IEEE, 1997, p. 496-499.

* cited by examiner

METHOD OF ANALYSING CELL SAMPLES, BY CREATING AND ANALYSING A RESULTANT IMAGE

CROSS REFERENCE TO RELATED APPLICATIONS

This application is a continuation of U.S. patent application Ser. No. 10/129,448 filed Aug. 27, 2002, now U.S. Pat. No. 7,155,050, which is a filing under 35 U.S.C. §371 and claims priority to international patent application number PCT/SE00/02124 filed Oct. 31, 2000, published on May 10, 2001, as WO 01/33573, which claims priority to application number 9903988-5 filed in Sweden on Nov. 3, 1999; the disclosures of which are incorporated herein by reference in their entireties.

FIELD OF THE INVENTION

The present invention relates to a method of comparing multiple samples of cell extracts for detecting differences in the protein composition of cells and cells extracts, and more particularly, to a method utilizing matched pair of labeling reagents for detecting such differences. By the expression samples of cell extracts is meant any sample that can be subject to the analysis method outlined in the present application.

BACKGROUND OF THE INVENTION

Researchers studying various aspects of cell biology use a variety of tools to detect and monitor differences in cell structure, function and development. An essential part of studying cells is studying the differences and similarities in the protein composition between the different cell types, stages of development and condition. Determining differences in the protein content between normal and cancerous cells or wild type and mutant cells, for example, can be a valuable source of information and a valuable diagnostic tool.

Mixtures of proteins can be separated into individual components according to differences in mass by electrophoresing in a polyacrylamide gel under denaturing conditions. One dimensional and two dimensional gel electrophoresis have become standard tools for studying proteins. One dimensional SDS (sodium dodecyl sulfate) electrophoresis through a cylindrical or slab gel reveals only the major proteins present in a sample tested. Two dimensional polyacrylamide gel electrophoresis (2D PAGE), which separates proteins by isoelectric focusing, i.e., by charge, in one dimension and by size in the second dimension, is the more sensitive method of separation and will provide resolution of most of the proteins in a sample.

The proteins migrate in one- or two-dimensional gels as bands or spots, respectively. The separated proteins are visualized by a variety of methods; by staining with a protein specific dye, by protein mediated silver precipitation, autoradiographic detection of radioactively labeled protein, and by covalent attachment of fluorescent compounds. The latter method has been heretofore only able to be performed after the isoelectric focusing step of 2D PAGE. Immediately following the electrophoresis, the resulting gel patterns may be visualized by eye, photographically or by electronic image capture, for example, by using a cooled charge-coupled device (CCD) or a laser based image detector.

To compare samples of proteins from different cells or different stages of cell development by conventional methods, each different sample is presently run on separate lanes of a one dimensional gel or separate two dimensional gels. Comparison is by visual examination or electronic imaging, for example, by computer-aided image analysis of digitized one or two dimensional gels.

However, each different sample in the separate gels must be prepared with exacting precision because no two gels are identical, the gels may differ one from the other in pH gradients or uniformity. The electrophoresis conditions from one run to the next may be different.

The drawbacks by running separate gels are partly overcome by a process disclosed in WO96/33406, entitled "Difference gel electrophoresis using matched multiple dyes", which is incorporated herein in its entirety. According to this known process the differences between multiple samples of proteins extracted for example, from different cells, are detected by labeling each sample of such proteins with a different one of a set of matched luminescent dyes. The matched dyes have generally the same ionic and pH characteristics but absorb and/or fluoresce light at different wavelengths, producing a different color fluorescence. In addition, the dyes should be similar in size. The thus labeled samples are then mixed together and co-electrophoresed on a single gel. The proteins common to each sample comigrate to the same position. Proteins that are different will migrate alone to different locations on the gel and will fluoresce different colors, thereby identifying which initial sample has one or more proteins which differ from the initial sample or samples.

The gel can be analyzed by a two (or more) wavelength fluorescence scanner, by a fluorescent microscope or by any known means for detecting fluorescence. An electronic detection system such as a laser scanning system with a photo multiplier tube or a charged-coupled device (CCD) camera and a white light source or light sources having predetermined wavelengths, two electronic images are made of the wet gel using different known filter sets to accommodate the different spectral characteristics of the labels. One image views fluorescence of the first dye using a first filter appropriate to filter out all light except that emitted at the wavelength of the first dye and the other image views fluorescence of the second dye using a second filter, appropriate to filter out all light except that emitted at the wavelength of the second dye. Exposure is about from a few milliseconds to 500 seconds. Each image can be considered as a grid-like array of pixel intensity values.

The thus obtained images are then analyzed according to WO96/33406 by a commercially available software package that either will subtract the first image from the second to identify spots that are different, or, alternatively, the images may be divided to leave only the spots not common to both images. In subtracting the images, like spots will cancel each other, leaving only those that are different. In ratio analysis, like spots will provide a value of one. Differences will result in values greater than one or less than one.

The above described analysis step in the method known from the WO96/33406 is sometimes very time-consuming.

The traditional method of 2D gel analysis applied on the electronic images obtained according to the technique disclosed in WO96/33406 may also be used. According to this technique each electronic image is individually analyzed in order to detect spots. Corresponding spots from the two images are then matched, compared and further analyzed.

Several drawbacks can be identified using the traditional method when analyzing the electronic images.

One drawback is the risks that spots are mismatched, i.e. spots believed to be corresponding in the two images are not. A reason to that may be that the detection of the electronic image is performed by a sensitivity that is too low, i.e. exactly the same spots are not detected in both images.

Another drawback might be that the further analyses, e.g. calculation of the differential expression between the two spots, have some inaccuracy. This is due to that a parameter related to a spot is not calculated in exactly the same way in the two images, e.g. a volume that represents a spot is determined by integration of an analysis area having different boundaries in the two images.

The matching procedure, shortly described above, is also a tedious and interactive process introducing variation in results depending on who is performing the interactive steps.

The object of the present invention is to achieve a less time-consuming method of evaluating the electronic images obtained from the electrophoresed mixture. Another object of the present invention is to achieve a higher degree of accuracy in the analysis of the electronic images where spots representing components of the cell extracts are detected.

One further object of the invention is to provide a method that is user friendly in that only few parameters need to be set in order to perform the measurements. This in turn will result in that the variation of the result of the measurements between users will be eliminated.

Still another object of the invention is to achieve a higher degree of automation when performing the measurements according to the invention.

And still another object of the present invention is that the results obtained by using the method will be considered highly reliable.

SUMMARY OF THE INVENTION

The above-mentioned objects are achieved according to the present invention by a method having characterizing steps set forth in the independent claim. Preferred embodiments are set forth in the dependent claims.

A great advantage with the method according to the invention is that the evaluation of the electronic images representing cell extracts can be preformed with a higher accuracy since exactly the same spot analysis area is used, applied exactly at the same location at the respective electronic images. The concept itself ensures that no miss-matches occur, i.e. the differential expression between corresponding spots in different images can be determined with a higher degree of accuracy.

Even very faint spots can be detected since a spot analysis area points out areas where a spot is supposed to be.

Furthermore, if no spot is found in the spot analysis area internal parameters related to the sensitivity in the analysis equipment can automatically be adjusted.

According to a preferred embodiment of the invention an alignment step is performed before the resultant electronic image is obtained.

In order to clearly illustrate the principles of the invention it is described in connection with an electrophoresis process. However, the invention is equally applicable in any 1- or 2-dimensional differential analysis method using other separation parameters than pH (charge) and size. Among these methods are "high pressure liquid chromatography" (hplc) and "cell sorting".

To illustrate how less time-consuming the analysis performed by the method according to the present invention compared to a corresponding analysis performed by conventional technique is, the following example is given: A batch of 20 gels of samples takes about one month for one man to analyze using the old technique. Using the method according to the present invention the corresponding analysis can be performed in less than one day.

DETAILED DESCRIPTION OF THE INVENTION

Figure 2:
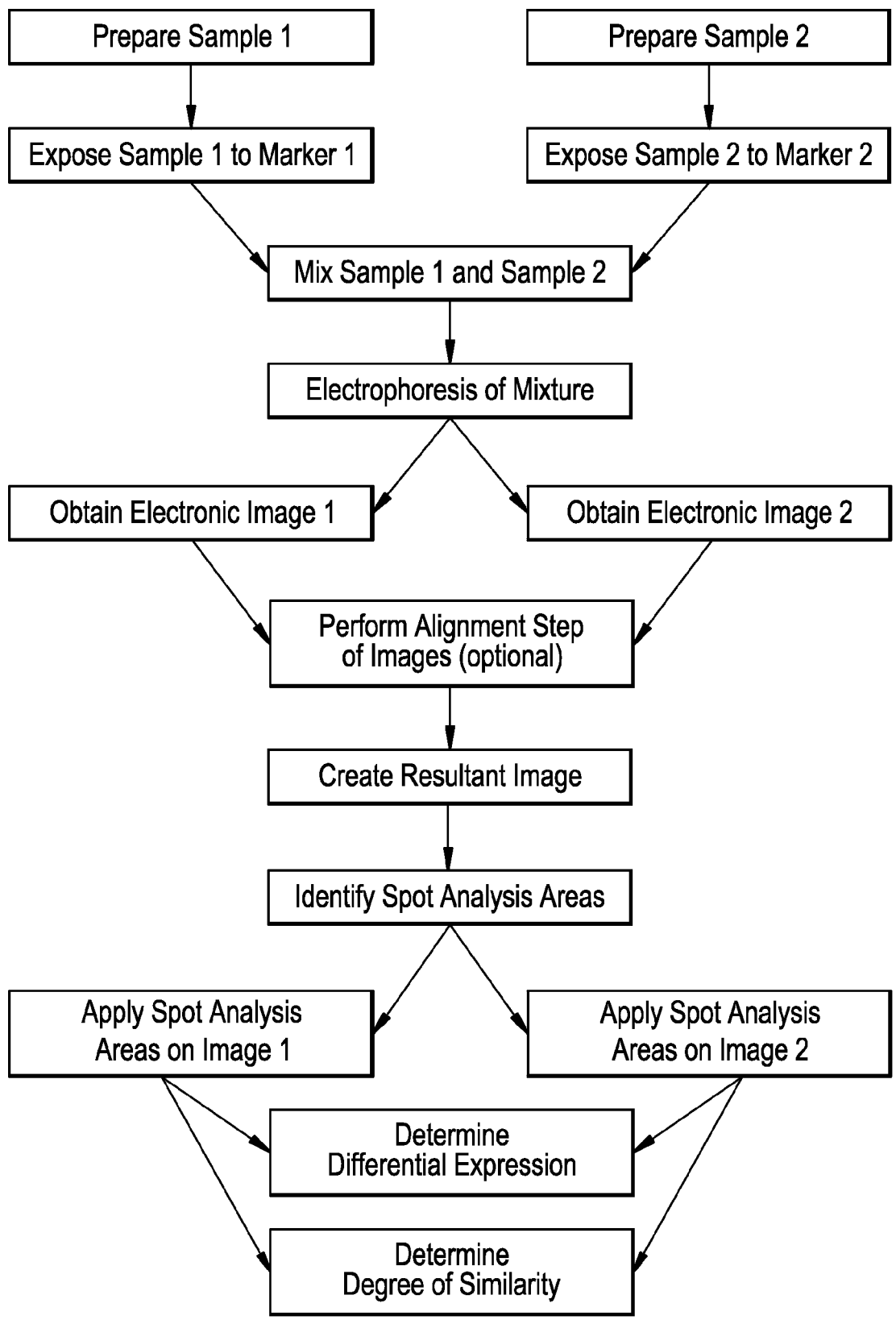
FIG. 2 is a flow diagram illustrating the method according to the invention.

FIG. 2 shows flow diagram illustrating the method according to the invention. The different steps illustrated in the flow diagram are described below with references to all the figures.

Throughout the description, in the example illustrating the invention is the separation step preferably performed by electrophoresis. However, the invention is equally applicable in any other separation method.

Preparation and Mixing Step

According to a preferred embodiment of the invention the process of the present invention employs a matched set of dyes wherein each dye in the set is generally equal to the other dyes in ionic and pH characteristics, and chemical reactivity for covalent attachment to proteins, yet fluoresces at a different wavelength, thereby exhibiting a different color luminescence when viewed. The dyes are preferably roughly equal in molecular weight, but need not be. Each one of the dyes within the matched set of dyes is used to label proteins in a different one of a set of different samples of cell extract so that each cell extract sample is labeled with a different dye within the set of dyes. After labeling, the extracts are mixed and electrophoresed in the same gel, either by one or two-dimensional electrophoresis.

The process described below discloses, for sake of simplicity, only two different cell extracts to be analyzed according to the present invention. It should however be noted that the process also is applicable to any higher number of cell extracts. With references to the schematic diagram of FIG. 1, a first cell extract is prepared by known techniques from a first group of cells 1, then labeled with the first dye of a matched pair of dyes, such as propyl Cyanine (3)-NHS. A second cell extract is prepared by known techniques from a second group of cells 2 then labeled with the second dye of the matched pair of dyes, such as methyl-Cyanine (5)-NHS. The structures and methods of preparation of the cyanine (3) and (5) are described in the above-mentioned WO96/33406. To label the cell extract mixture, the reactive form of the dye and the protein extract are incubated in a suitable container, such as a test tube 3 for a time sufficient to allow for the formation of a covalent bond between the reactive form of the dye and potential attachment or binding sites on the proteins in the extract. The period of time is generally from 15 to 30 minutes, depending on the temperature. The temperature range is generally from about 0° C. to 25° C. The reaction between the dye and the proteins may be quenched after a sufficient percentage of available binding sites on the protein molecule are covalently bound to the dye. Any suitable known quenching material may be used.

The first and second group of cells (1,2) can be any two sets of cells the protein content of which one wishes to compare or contrast. For example, the first group of cells can be the wild-type, or normal, cells, and the second group of cells can be mutant cells from the same species. Alternatively, the first group of cells can be normal cells and the second group can be cancerous cells from the same individual. Cells from the same individual at different stages of development or different phases of the cell cycle can be used also.

The differences in protein composition between cells of the same type from different species can also be the subject of study by the process of the present invention. In addition, the process of the present invention can be used to monitor how cells respond to a variety of stimuli or drugs. All of the events that might alter cell behavior as expressed through protein changes, that includes modifications to proteins such as "Post Translational Modification" (PTM), can be detected without the need and expense of high precision 2D PAGE systems. Those skilled in the art will recognize that the proteins for comparison may also be derived from biological fluids, such as serum, urine, spinal fluid, bacterial, mammalian, or plants etc.

Although the preferred embodiment of the invention is illustrated by an example where the cell extract is labeled by a fluorescent dye the invention is equally applicable when analyzing cell extract labeled by other identifying labels. WO98/23950 discloses a number of alternative labels, e.g. by metabolic labeling with any suitable radionuclide (e.g. tritium, a radionuclide of sulfur or a radionuclide of carbon) or by chemical or enzymatic labeling with any suitable radionuclide (e.g. radio-iodine). It is also possible to use any stable naturally occurring isotope. The thus labeled proteins are imaged with any detector that is capable of detecting the label used. For instance by using densitometry or spectroscopy, or by detecting radioactivity.

Electrophoresis Step

Figure 1:
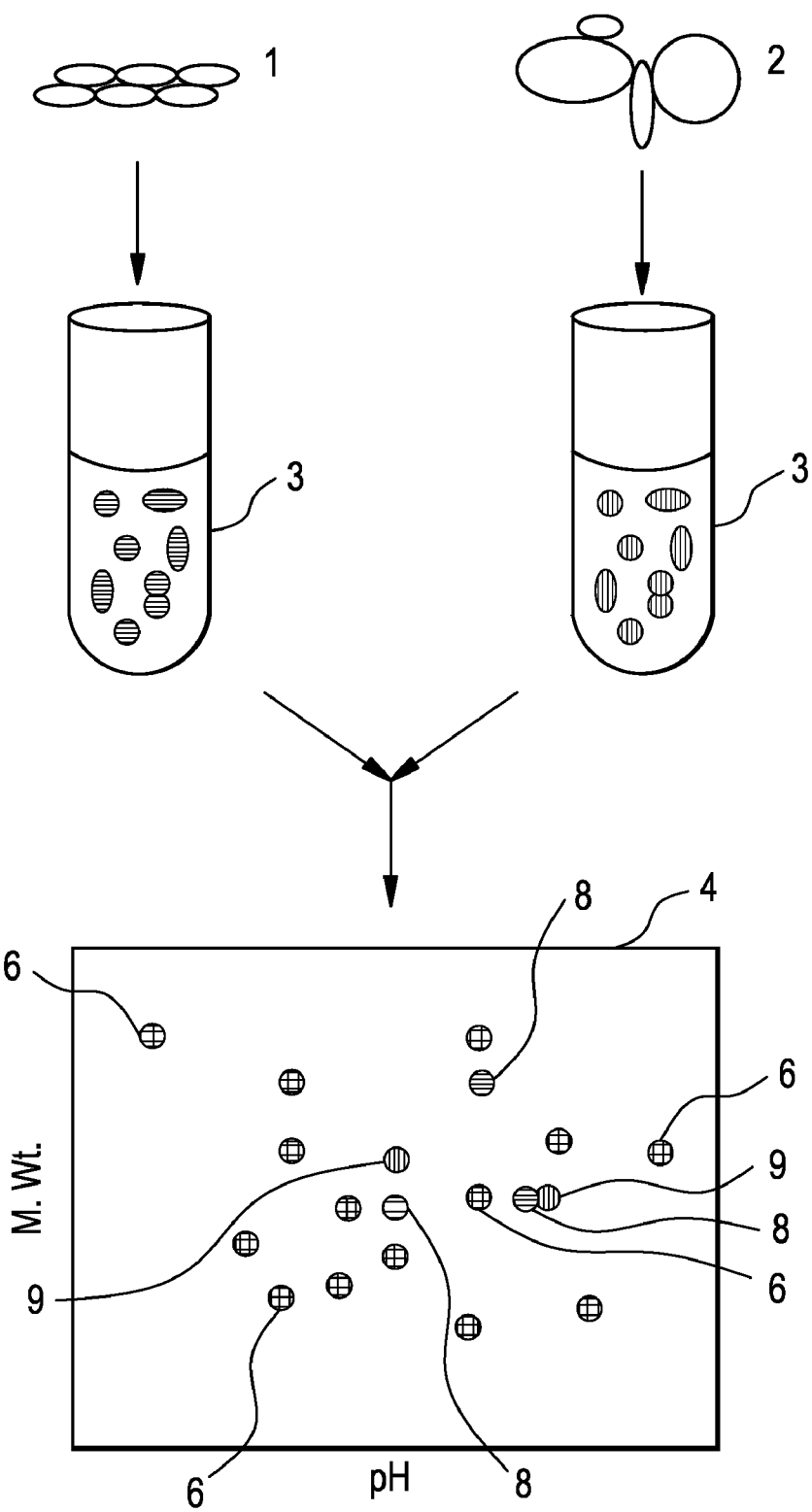
FIG. 1 is a schematic diagram of the process according to the prior art.

The labeled samples are mixed and, as illustrated in FIG. 1, applied in measure aliquots to one gel 4, then preferably subjected to 2D PAGE. One dimensional SDS electrophoresis can be used instead of 2D PAGE. The procedures for running one dimensional and two dimensional electrophoresis are well known to those skilled in the art.

Proteins that the two cell groups have in common form coincident spots 6. The fluorescent intensity from identical proteins from either group will theoretically be the same for the vast majority of proteins. Proteins that the two groups do not have in common 8,9 will migrate independently. Thus, a protein that is unique or of different relative concentration to one group will have a different fluorescence intensity.

As described above in relation to the known technique according to WO96/33406 the gel can be analyzed by a two wavelength fluorescence scanner, by a fluorescent microscope or by any known means for detecting fluorescence. Two electronic images are made of the wet gel using different known filter sets to accommodate the different spectral characteristics of the labels. Each electronic image can be considered as a grid-like array of pixel intensity values, electronic image $I_1$ with pixel intensity values $p_1, \ldots, p_N$, and electronic image $I_2$ with pixel intensity values $p'_1, \ldots, p'_N$.

Alignment Step

According to a preferred embodiment of the invention is an alignment step performed before a resultant electronic image is created. This step is optional and is only performed if considered necessary.

Although the electrophoresis of the two different cell samples is performed in the same gel and mismatches between different gels are avoided is it often considered necessary to perform an alignment step before creating the resultant electronic image. The reason is that the markers used, e.g. luminescent markers, as labels on the cell extracts might under certain circumstances influence some characteristics, e.g. the size, of the molecules of the cell extract. The object of the alignment step is to ensure that corresponding pixel intensity values, i.e. pixel intensity values representing the same spot, e.g. the same protein, coincide in the resultant image.

The pixel intensity values of the two electronic images are compared to each other using conventional image analysis methods in order to check if patterns on one image coincide with corresponding patterns on the other image. Applying e.g. a cross correlation function when comparing the intensity values in predetermined limited areas of the two images is one obvious way to perform this. The cross correlation function provides a score value indicating the degree of alignment between the two images.

One result of this initial comparison could be that the electronic images already are aligned to each other and in that case no alignment is necessary.

If the images are not aligned to an acceptable degree several different alignment sub-steps can be performed:

Aligning the electronic images with respect to each other.
Applying a linear transformation.
Applying a more complex stretching function.

Each sub-step can be used alone or in combination with one or all other steps.

The alignment can be performed in two dimensions. The electronic images are continuously compared to each other during the alignment step.

Combining Step

Figure 3:
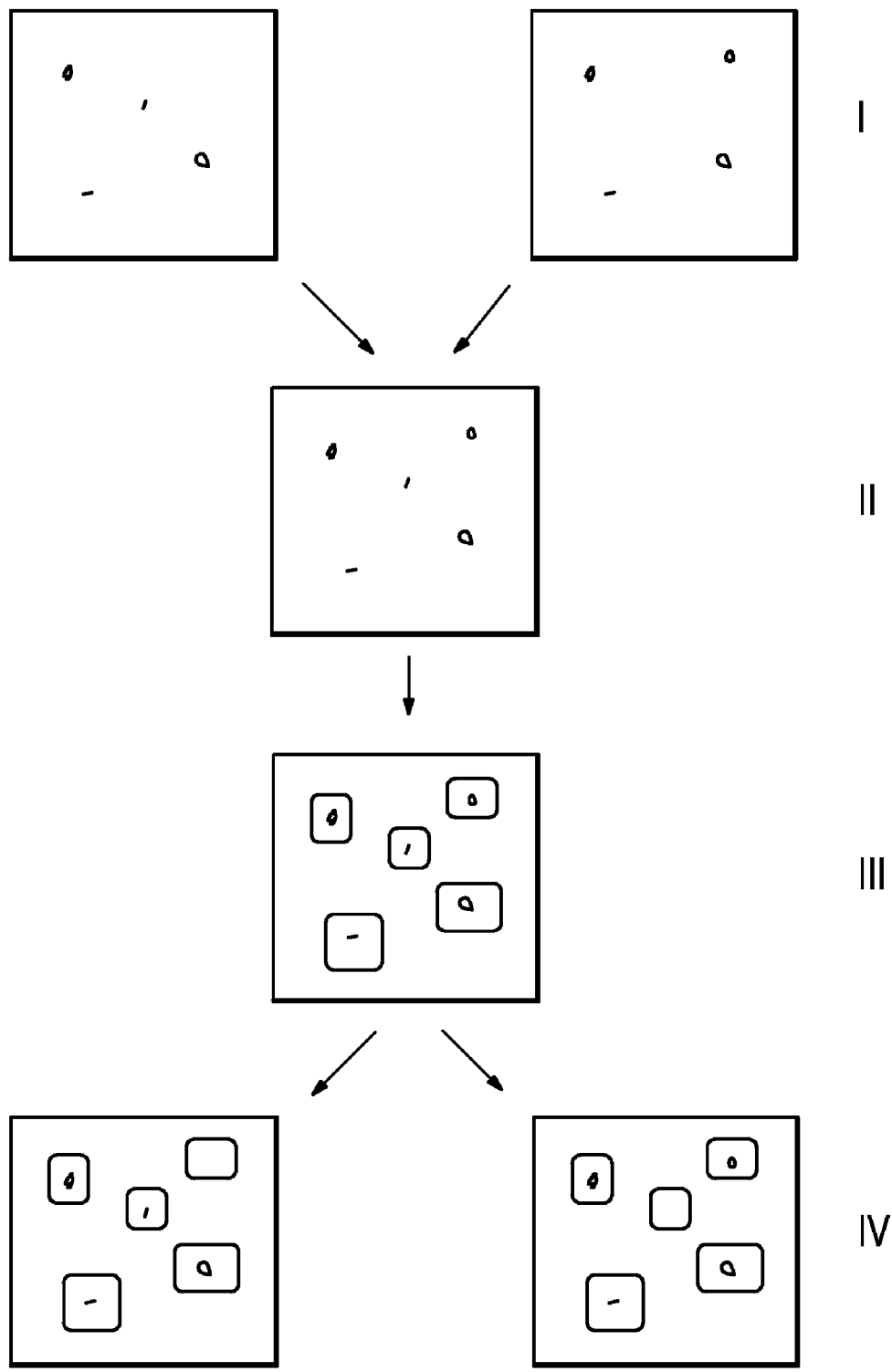
FIG. 3 is flow diagram illustrating important steps of the method according to the invention.

A presumption for achieving a good overall result of the method according to the invention is naturally that the alignment between the electronic images is good so that pixel intensity values at the same location in the two electronic images really represent the same spot in respective cell sample (only of course when no changes that influence the proteins have occurred between the samples). Two aligned electronic images can be seen in FIG. 3, step I. As can be seen are they slightly different in that one of the spots is missing in the other image.

One resultant electronic image ($I_{res}$) is created of the obtained two electronic images by combining corresponding pixel intensity values $p_1, \ldots, p_N$, and $p'_1, \ldots, p'_N$ from the electronic images $I_1$ and $I_2$, respectively, according to a predetermined function. Step II in FIG. 3. One straightforward way of combining the pixel intensity values is achieved by forming the sum of corresponding pixel intensity values, e.g. $p_{1res}=(p_1+p'_1)/2$.

Another way of calculating the resulting intensity values is achieved by $p_{1res}=\sqrt{p_1^2+p'_1^2}$.

A more general and complex function can of course be used when calculating a resultant intensity value, e.g. taking into account adjacent intensity values or taking into account an average of all or a subset of pixel intensity values.

A resultant electronic image $I_{res}$ thus obtained comprises a grid-like array of resultant pixel intensity values $p_{1res} \ldots p_{Nres}$.

Analysis of Resultant Image

The resultant image is then analyzed in order to identify spot analysis areas.

Different methods of analyzing images represented by pixel values in order to group them into spot analysis areas according to predetermined criteria are well known to persons skilled in the art. One class of algorithms that can be used is described in "A new segmentation and modeling algorithm for electrophoresis gels" by E. Battens et al, Electrophoresis 1997, 18, pp. 793-798.

Another class of algorithms that also can be used is based on so-called edge detection, which is a well-known pattern detection algorithm.

According to a preferred embodiment of the invention the number of spot analysis areas to be identified in the resultant image is set to a predetermined value, e.g. 800. That value can be regarded as a level of sensitivity in that the e.g. 800 best spot analysis areas, according to a predefined scoring function, where the score is based on a set of suitable spot features are extracted.

It should especially be noted in a preferred embodiment of the invention that the number of spot analysis areas preferably is the only parameter to be set when the spot analysis areas are identified.

The predetermined value can of course be set to any appropriate value.

Analysis of Spot Analysis Areas.

It is sometimes necessary to analyze the spot analysis areas before they are applied on the electronic images. The reason is to ensure that the analysis areas represent a true protein spot and not is the result of an unpredictable artifact, e.g. dirt or dust. If the analysis of the spot analysis areas indicate that an area not represents a true protein spot that area is classified as an artifact in order to make it possible to exclude that area from the further method steps. The areas classified as artifacts are still available if considered necessary to further analyze them.

There are many criteria that can be applied in order to identify true protein spots. Among those can be mentioned the size of a spot analysis area and the three dimensional topography of a spot analysis area where the degree of edginess in the area is determined by applying e.g. the Laplace-filtration method, which is a well-known method for filtration of three dimensional objects. For instance is a dust particle identified in that it has a much more erratic and narrow edge compared to the much smoother curve form of a true protein spot.

A normalization of the identified true protein spot features with regard to a corresponding "mean" feature for a subset of all spots where obvious outliers have been removed is performed. Limits are then determined in order to classify the spots in relation to the normalized features.

Another method of identifying true protein spots is to apply an artificial neural network, which is during a learning process "learned" how to identify true protein spots when fed with normalized features mentioned above.

The analysis and filtration described above may be regarded as a dust filtering step.

Apply Spot Analysis Areas on Electronic Images

The thus obtained spot analysis areas are then applied on the electronic images, in this example images $I_1$ and $I_2$. Step IV in FIG. 3. It is important to notice that the same spot analysis areas are applied on both images. If the images have been aligned (aligned, stretched etc.) to each other prior the combining step it is of course the aligned electronic images that are used during the further analysis.

Figure 4A:
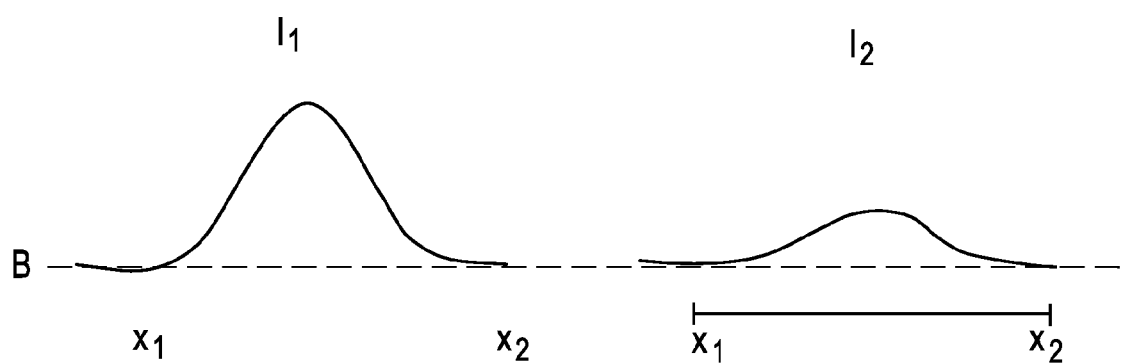
FIG. 4A discloses a two-dimensional representation of a number of pixel intensity values in two electronic images.

FIG. 4 illustrates a great advantage that is achieved by using the same areas on both images.

In FIG. 4 is disclosed a two-dimensional representation of a number of pixel intensity values along one row of the arrays in images $I_1$ and $I_2$, respectively. One way of analyzing these images is to determine the area below the curve represented by the peak values of the intensity values, above a predetermined base level (B) and between $x_1$ and $x_2$ in the figure. Although the maximum amplitude of the curve differs between the images the contribution from image $I_2$ is substantial. In particular in cases where spot represented by the curve in image $I_2$ is so faint that it should hardly be detected at all using the technique according to the prior art.

Figure 5:
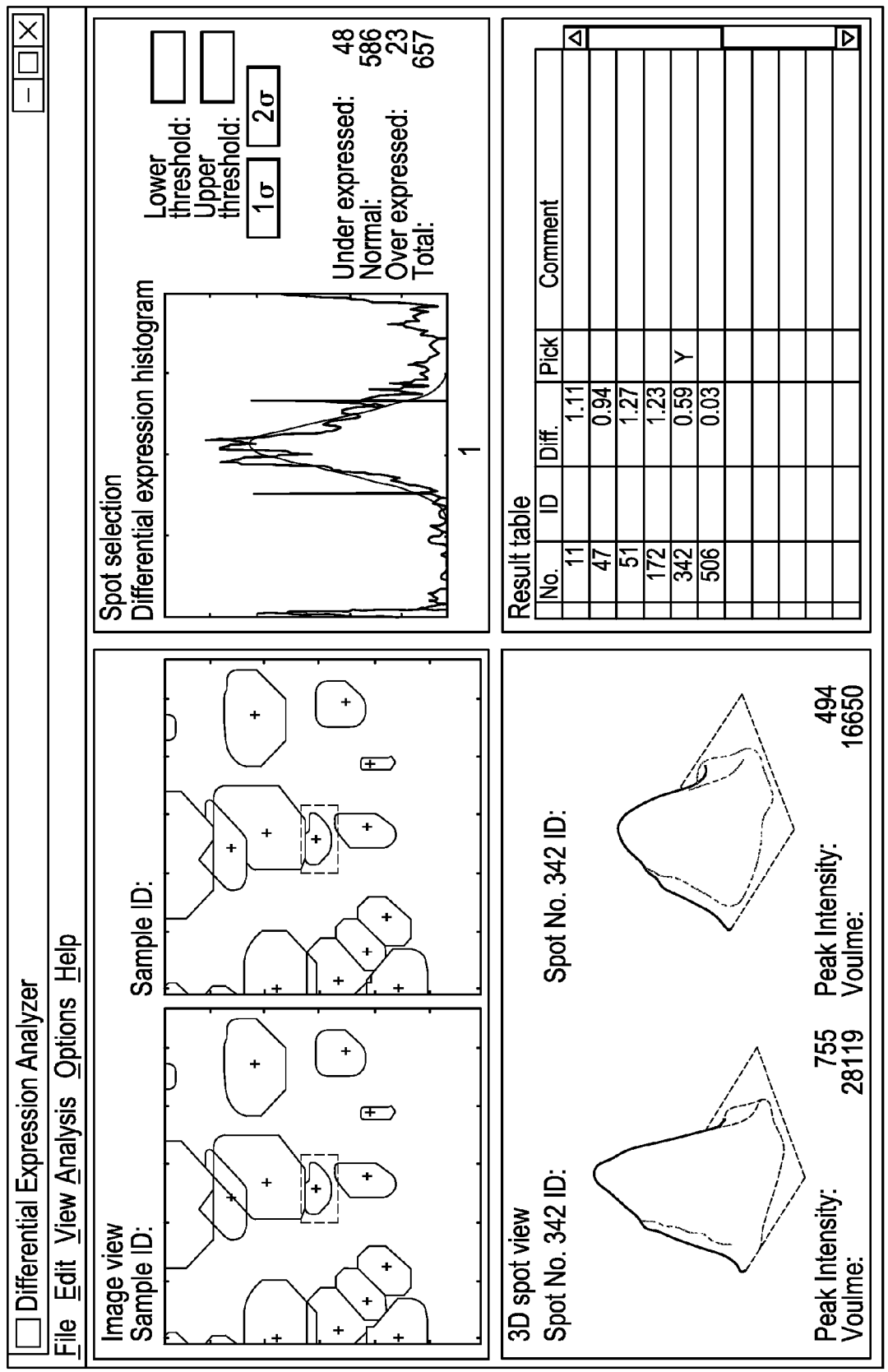
FIG. 5 shows a data display illustrating the method according to the invention.

When analyzing the images the volume of a so-called 3D map in the spot analysis areas is determined as illustrated in FIG. 5, "3D spot view". A 3D map is a three dimensional representation of the pixel intensity values of an electronic image of an electrophoresed cell sample.

Determine Degree of Similarity

Figure 4B:
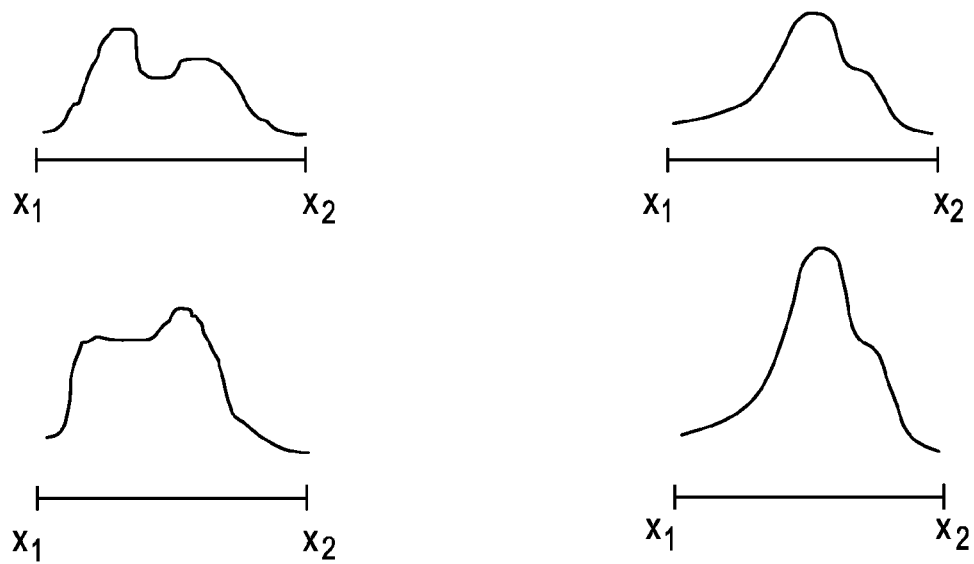
FIG. 4B discloses a two-dimensional representation of a number of pixel intensity values illustrating the degree of similarity.

According to a preferred embodiment of the invention is the degree of similarity between corresponding spot analysis areas in two (or more) images determined. With the expression similarity is here meant the similarity between corresponding spot analysis areas regarding the 3-dimensional curve-form. To further illustrate this is shown in FIG. 4B a representation of two different spot analysis areas applied on two electronic images. It must be observed that FIG. 4B only shows a two dimensional representation of a two dimensional slice of a spot analysis area represented by a row of pixel intensity values in order to illustrate the principle. When determining the degree of similarity it is applied in three dimensions on all pixel intensity values of a spot analysis area.

The left curves show a spot analysis area from the two images having a low degree of similarity, i.e. the curves are not similar to each other. This may be interpreted as an indication that there is some uncertainty regarding the analysis of this spot analysis area that may affect the further analysis. This uncertainty must sometimes be further analyzed and can be related to the identity of the protein represented by the pixel intensity values of the analysis area; to post translational modifications of the proteins or to unidentified problems regarding the electrophorsis.

The right curves show a spot analysis area from the two images having a high degree of similarity, i.e. the curves are similar to each other. In this case the result of the determined degree of similarity ensures that the identity of the protein represented by the pixel intensity values of the analysis area can be determined and the further analysis can be performed with a higher degree of accuracy.

There are many different ways of determining the above-mentioned degree of similarity between the curve forms.

According to a preferred embodiment of the invention is the so-called "Pearson Correlation Method" used, which is well known to persons skilled in the art, to determine the value representing the degree of similarity. Other more general methods may also be used.

Among those can be mentioned performing normalization with regard to the pixel intensity values and to the size of the spot analysis area and determining the squared values of the differences between the corresponding pixel intensity values.

It should be noted that the degree of similarity does not depend of the amplitude of the three-dimensional curve-forms but of the similarity of the curve forms, which is illustrated in FIG. 4B.

The result of this step is a measure of the degree of similarity, whereas e.g. a measure close to 1 represents high degree of similarity and values less than 1 indicates lower degree of similarity.

A presumption for determining the degree of similarity that provides the higher degree of accuracy as mentioned above is that the spot analysis areas are determined according to the steps outlined above.

Determine Differential Expression

According to established technique a method of analyzing images representing detected spots of cell samples in order to compare corresponding detected spots a so-called differential expression DE between predetermined parameters of the detected spots is determined. The differential expression is defined as $$DE = \frac{B_{quantity}}{A_{quantity}}.$$

$B_{quantity}$ and $A_{quantity}$, respectively, are e.g. determined as the volume within each spot analysis area as indicated above.

DE indicates changes to the spots between the images. If DE is near 1 it may be concluded that no changes have occurred.

The differential expressions of a pair of electronic images are calculated and can be arranged in a histogram as shown in FIG. 5, "Spot selection". In a situation where the majority of the proteins are unchanged between the two images all the spots have almost the same DE, resulting in a histogram curve having the majority number of spots close to the same DE. In an ideal situation, i.e. the two samples have exactly the same number of protein molecules in each cell sample, the DE theoretically is 1 when no changes have occurred with the proteins. However, due to many factors, a systematic deviation of the pixel intensity values might result in that the maximum amplitude of the histogram curve differs from 1.

A histogram curve corrected in respect of any systematic errors can be provided in many different ways. The set of differential expressions could be normalized with respect to the mean value of the DEs. The normalized set of DEs could then be used to arrange a normalized histogram curve. Another way is to identify the maximum amplitude of the histogram curve and to define corresponding DE as 1.

The spots represented by a DE that differs from 1 in a corrected histogram curve can then easily be identified and further analyzed.

As can be seen in the data display of the histogram in FIG. 5 limits can be applied in order to sort out under or over expressed spots. The limits may be chosen such that a predetermined percentage of the spots are regarded as under or over expressed. A Gauss curve may also be applied and adjusted to correspond to the histogram curve in order to perform the further analysis.

Data Display

FIG. 5 shows a data display illustrating the method according to the invention. As can be seen is the display divided in four different views: "Image view", "Spot selection", "3D spot view" and a "Result table". All these views are linked so that if e.g. a spot pair is chosen (pointed at) on the Image view it is at the same time seen at the 3D spot view and marked in the "differential expression histogram" in the Spot selection view and in the Result table. It is of course also possible to choose a particular pair of spots in the result table which than at the same time are highlighted in the others views.

One feature of the Spot selection view of the data display worth mentioning is the possibility of changing the parameter used on the vertical axis. It is thus possible to choose a specific pair of spots in the Spot selection view having a differential expression indicated on the horizontal axis and e.g. the area, volume or the degree of similarity indicated on the vertical axis. This feature is especially powerful when analyzing pair of spots with a differential expression different from the majority of pair of spots. It is then possible to easily obtain values of the different above-mentioned parameters in order to analyze more accurately the specific pair of spots.

As indicated above all or some steps of the method according to the invention are also applicable in one-dimensional separation methods, e.g. one-dimensional electrophoresis.

All steps described above may be performed in a fully automated process having the capability of being loaded with analysis data from many different samples and capable of performing concurrent analysis on all these data.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A method of comparing multiple samples of cell extract containing a plurality of components comprising:
    preparing at least two samples of cell extracts from at least two groups of cells;
    exposing each of said at least two samples of said cell extracts to at least one different marker of a set of matched markers to bind the at least one different marker to the cell extracts to label the cell extracts, each marker within said set of matched markers being capable of binding to the cell extracts and can be individually detected from all other markers within said set of matched markers;
    mixing said at least two samples of the labeled cell extracts to form a mixture;
    separating said mixture to separate a plurality of components within the cell extracts;
    obtaining at least two electronic images of the separated mixture by detection of-individual markers in the set of matched markers, each image being represented by detection of the at least one different marker that is unique from the set of matched markers;
    creating one resultant electronic image ($I_{res}$) of the obtained at least two electronic images;
    analyzing the resultant image in order to identify spot analysis areas; and
    applying said identified spot analysis areas on each one of the at least two electronic images for evaluating said identified spot analysis areas in order to detect spots representing the plurality of components of said cell extracts.

2. The method of claim 1, wherein separating said mixture is performed by electrophoresis.

3. The method of claim 2, wherein said set of matched markers are a luminescent set of dyes that covalently bind at least one dye to the cell extracts to label the cell extracts, each dye within said luminescent set of dyes being capable of covalently binding to the cell extracts and having generally a similar ionic and pH characteristics as all other dyes with the luminescent set of dyes within said set of dyes and emitting light at a wavelength sufficiently different from all other dyes within said set of dyes to present a different colored light.

4. The method of claim 1, further comprising:
determining a degree of similarity between pixel intensity values in the applied said identified spot analysis areas in the two electronic images.

5. The method of claim 4, wherein said degree of similarity is determined by a Pearson Correlation method.

6. The method of claim 1, wherein a number of the identified spot analysis areas in the one resultant electronic image is set to a predetermined value.

7. The method of claim 1, wherein the identified spot analysis areas are subjected to filtration in order to classify the identified spot analysis areas according to a predetermined criteria related to a three dimensional topography of said identified spot analysis areas.

8. The method of claim 1, further comprising:
comparing corresponding detected spots by forming a differential expression (DE) between predetermined parameters of said detected spots.

9. The method of claim 7, wherein the differential expressions are normalised and arranged in a histogram.

10. The method of claim 9, wherein predetermined limits representing under and over expressed the corresponding detected spots are set in the histogram.

11. The method of claim 10, wherein according to said predetermined function each of the corresponding pixel intensity values are determined as $$p_{1res} = \sqrt{p_1^2 + p_1'^2}.$$

12. The method of claim 1, further comprising:
providing an alignment to be performed before creating the resultant electronic image ($I_{res}$) in order to align the electronic images so that the spots coincide.

13. The method of claim 12, further comprising:
aligning the at least two electronic images with respect to each other.

14. The method of claim 1, wherein preparing the at least two samples is controlled by a user interface display comprising a predetermined number of predefined changeable views, all simultaneously available, each being a graphical or a numerical representation of different steps performed, wherein said numerical representation comprises graphical or numerical objects of the detected spots or the identified spot analysis areas, where corresponding objects are linked together in different views.

15. The method of claim 6, wherein the predetermined value is 800.

16. The method of claim 1, wherein creating one resultant electronic image ($I_{res}$) of the obtained at least two electronic images is achieved by combining corresponding pixel intensity values ($p_1, \ldots, p_{2N}; p'_1, \ldots, p'_N$) according to a predetermined function.

17. The method of claim 16, wherein said predetermined function is a summation ($p_{1res}=(p_1+p'_1)/2$) of the corresponding pixel intensity values.

18. The method of claim 12, further comprising:
applying a linear transformation.

19. The method of claim 12, further comprising: applying a stretching function.

* * * * *